Oct. 26, 1965 WOO F. CHOW 3,214,611
CLOCK CONTROL CIRCUIT WITH CHARGE STORAGE DIODE PAIRS FOR EFFECTING SLOWER CLOCKING OPERATION
Filed Sept. 23, 1963
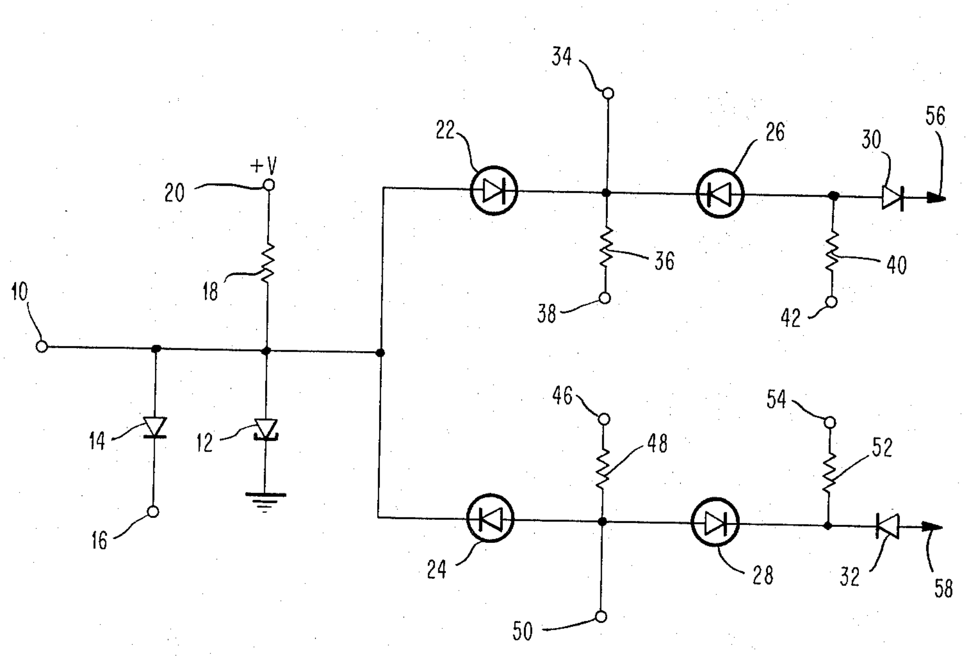
INVENTOR
WOO F. CHOW
BY J. Donald Weber, Jr.

United States Patent Office 3,214,611
Patented Oct. 26, 1965

3,214,611

CLOCK CONTROL CIRCUIT WITH CHARGE STORAGE DIODE PAIRS FOR EFFECTING SLOWER CLOCKING OPERATION

Woo F. Chow, Horsham, Pa., assignor to Sperry Rand Corporation, New York, N.Y., a corporation of Delaware Filed Sept. 23, 1963, Ser. No. 310,699
5 Claims. (Cl. 307—88.5)

This invention relates to a circuit for selectively controlling clock signals. More particularly, the circuit uses stored-charge diodes as the active elements for controlling the passage of clock signals in accordance with the operating condition of an input logic circuit.

In electronic data processing equipment, many circuits are utilized for performing various operations, for example logic functions and the like. Usually, an arrangement must be made for clocking (i.e., applying regularly recurring signals for scheduling or synchronizing operations of the circuits) the multitude of circuits such that the synchronous operation thereof can be achieved. That is, a clock signal is applied to the various circuits in order to initiate or terminate operation thereof such that all of the circuits are functioning with the same time base. One of the problems encountered in this type of equipment, has been the application of the clock signal. That is, the clock signal applied at one location in the equipment will not be completely synchronous with the clock signal applied at another location in the equipment. Moreover, the clock signal is usually a free-running, regularly-recurring signal. The instant circuit was developed and designed to avoid these problems. That is, this clock control circuit may be located in a particular location in the equipment to apply clock signals thereto but only when the control circuit has been properly triggered by a central control logic circuit. Moreover, this circuit permits the controlled circuits to operate in a relatively stable condition whereby essentially flip-flop action of the circuit is provided.

In this circuit, two pairs of charge storage diodes are connected together in bucking or opposite polarity fashion. That is, one pair is connected anode-to-anode and the other pair is connected cathode-to-cathode. Clock signals are supplied to these pairs of oppositely poled diodes. An input logic circuit is connected to each of the pairs of diodes. The logic circuit controls which diode of each of the diode pairs is rendered conductive to pass forward current therethrough. The forward current is supplied by substantially constant bias sources and produces charge storage in the conductive diode. Subsequently, a reverse current signal may be generated through the diodes having charge stored therein in response to the application of a central clock signal. Since only one of each of the pairs of storage diodes can conduct forward current because of the polarities thereof, only these diodes can conduct reverse current. Therefore, in view of the opposite polarities of the diodes and applied signals, different output terminals will receive signals at different times. One of these signals is termed the Set Clock signal, the other signal is termed the Reset Clock signal.

One object of this circuit is to provide a clock control circuit for semiconductor logic circuits.

Another object of this invention is to provide increased logic circuit flexibility.

Another object of this invention is to provide a clock control circuit which permits the clock signal to be applied to logic circuits at preselected times, which effects slower clocking operation but does not reduce the operating speed of the logic circuits.

Another object of this invention is to provide a clock control circuit which produces an effectively slower clock signal such that the "information available" time for the logic circuit is increased, without slowing the logic circuit operation.

These and other objects and advantages of this invention will become more readily apparent upon reading the following description in conjunction with the attached drawing which is a schematic diagram of the clock control circuit.

In the diagram, terminal 10 represents the input to the circuit. This input may be provided with signals from any logic circuit or other type of control circuit. The input terminal is connected to the anode of tunnel diode 12. The cathode of tunnel diode 12 is returned to a suitable potential source, for example ground. The tunnel diode may be for example a 1N3130 type of tunnel diode which has a 50 milliampere peak current. As is typical, tunnel diode 12 has two stable operating states (i.e., low and high voltage states) and an unstable, negative resistance state or condition. Also connected to the anode of tunnel diode 12 is one terminal of resistor 18 which may be on the order of 150 ohms. Another terminal of resistor 18 is connected to source 20. Source 20 may be any conventional type of substantially constant potential source, for example a battery or the like, capable of supplying approximately +6 volts. The resistor 18, source 20 combination provides a substantially constant current source. This substantially constant current source is designed to bias tunnel diode 12 for bistable operation. Moreover, the operating conditions of tunnel diode 12 are so arranged that the tunnel diode 12 may be switched to the high voltage operating condition by the application of an input signal at terminal 10, and switched to low voltage operating condition by the application of a reset signal, as described subsequently. It is equally important that tunnel diode 12 will not be switched either to the high or low level operating conditions by the application of current signals from the switching portion of the circuit as will be explained subsequently. The anode of rectifier diode 14 is connected to the anode of tunnel diode 12. The cathode of diode 14 is connected to source 16. Source 16 may be any conventional source capable of supplying periodic pulses which are negative going pulses. That is, the pulses supplied by source 16 will have a base line potential of approximately 0 volts with a peak magnitude of approximately −3 volts for the pulse. This source and diode combination is the reset clock network through which tunnel diode 12 may be selectively returned to the low voltage operating condition, noted supra.

The anode of storage diode 22 is connected to the anode of tunnel diode 12. The cathode of storage diode 22 is connected to the cathode of storage diode 26. The anode of storage diode 26 is connected to the anode of rectifier diode 30. The cathode of rectifier 30 is connected to output terminal 56. The storage diodes 22 and 26 may be any typical diode capable of storing charge therein in response to forward current flow therethrough. Typically, Hewlett Packard storage diodes may be utilized. Rectifier diode 30 may be any type of high-speed-switching rectifier diode exhibiting little or no storage capabilities. An HD5000 diode is typical. Source 34, the set clock source, which may be any conventional source capable of supplying regularly recurring positive going pulses, is connected to the cathodes of storage diodes 22 and 26. The pulses supplied by source 34 may have a base line potential of 0 volts and a peak magnitude of approximately +3 volts. Also connected to the cathodes of diodes 22 and 26 is one terminal of resistor 36 which may be on the order of about 3000 ohms. Another terminal of resistor 36 is connected to source 38 which may be any conventional type of source capable of supplying a substantially constant potential of approximately −6 volts. Connected to the anodes of diodes 26 and 30 in one terminal of resistor 40 which may be on the order of 100 ohms. Another terminal of resistor 40 is connected to source 42 which may be any conventional type of source capable of supplying a substantially constant potential of approximately +0.30 volt. The parameters specified are not to be limitative of the invention. However, these design considerations of the circuit are such that the potential supplied by source 42 is insufficient to cause diode 30 to be forward conducting but is sufficient to normally cause diode 26 to be forward conducting. That is, the silicon rectifier diode 30 has a forward breakpoint potential of about +600 millivolts. The signal supplied by source 34 must be large enough that it will overcome the potential drop across rectifier diode 30 when applied thereto but will not supply an excessive signal to tunnel diode 12 when applied thereto.

The cathode of storage diode 24 is connected to the anode of tunnel diode 12. The anode of storage diode 24 is connected to the anode of storage diode 28. The cathode of storage diode 28 is connected to the cathode of rectifier diode 32. The anode of rectifier diode 32 is connected to output terminal 58. Storage diodes 24 and 28 are similar to storage diodes 22 and 26. Rectifier diode 32 is similar to rectifier diode 30. Connected to the anodes of storage diodes 24 and 28 is source 50. Source 50 may be any conventional type of source capable of supplying regularly recurring pulses. The regularly recurring pulses supplied by source 50 are similar to, but opposite in polarity from, the signals supplied by source 34. That is, the signal supplied by source 50 has a base line potential of approximately 0 volts and a peak magnitude of approximately −3 volts. Although it is not required, the signals supplied by sources 34 and 50 may be applied by the same central source with one of the signals being supplied via an inverting circuit and, if desired, a variable delay line. Thus, the signals supplied to sources 34 and 50 may occur simultaneously or at different times as desired.

Also connected to the anodes of storage diodes 24 and 28 is one terminal of resistor 48 which may be on the order of 3000 ohms. Another terminal of resistor 48 is connected to source 46 which may be any conventional type of source capable of supplying a substantially constant potential of approximately +6 volts. Connected to the cathodes of diodes 28 and 32 is one terminal of resistor 52 which may be on the order of 100 ohms. Another terminal of resistor 52 may be connected to source 54 which may be any conventional source capable of supplying substantially constant potential of approximately +0.30 volt. Again, the suggested values and parameters are not meant to be limitative of the invention but are rather preferred parameters used in the design consideration of the preferred embodiment of the invention. That is, forward current normally flows in storage diode 24 (but not in diode 28 because of the potential applied at the cathode thereof) until a high voltage signal is supplied by tunnel diode 12.

In the operation of the circuit, it is assumed that the potential values exhibited at the anode of tunnel diode 12 for the high and low voltage operating conditions are +450 and +50 millivolts respectively. If it is initially assumed that the tunnel diode 12 is in the low voltage operating region, the anode potential thereof is approximately +50 millivolts. Therefore, the anode of storage diode 22 and the cathode of storage diode 24 are both at +50 millivolts. Each of these diodes is relatively nonconducting until a potential difference across the electrodes thereof in the forward direction exceeds approximately 250 millivolts in the case of germanium diodes and 450 millivolts in the case of silicon diodes. In accordance with the suggested parameters and component values, the cathode of storage diode 22 is at approximately −300 millivolts. Similarly, the anode of storage diode 24 is approximately at +650 millivolts. Clearly, diode 22 is cut off and conducts no forward current. Contrariwise, storage diode 24 is forward biased and conducts forward current therethrough whereupon charge is stored therein. Therefore, as noted supra, the biasing conditions on the tunnel diode 12 are critical since the tunnel diode must not be inadvertently switched to the high voltage operating condition. As a corollary to the conduction conditions of storage diodes 22 and 24, it will be seen that storage diode 26 is forward biased and conducts forward current therethrough such that charge is stored therein. Additionally, storage diode 28 is biased below the knee voltage and cut off whereby forward current and charge storage does not take place therein. Therefore, the application of set and reset clock signals by sources 34 and 50 respectively produces reverse current flow in the storage diodes which have had forward current therethrough.

That is, the positive going clock signal supplied by source 34 produces a current signal through storage diode 26 inasmuch as charge was stored therein. The reverse impedance of storage diode 26 is substantially less than the impedance of the current source comprising resistor 36 and potential source 38 such that the greater portion of the current supplied by the clock signal passes through diode 26. Similarly, the forward impedance of rectifier diode 30 is substantially less than the impedance of the current source comprising resistor 40 and potential source 42 whereby the greater portion of the current supplied by the clock signal is passed through diode 30 to output terminal 56. Thus, a Set Clock signal is applied to the output terminal 56. The output signal or Set Clock signal which may be supplied to any of the set clock terminals in additional circuitry (not shown) exists for the duration of the clock signal supplied by source 34 or the charge recovery period of storage diode 26, whichever is shorter. This signal is, furthermore, synchronous with the centrally supplied clock signal (supplied to source 34) and can only be produced when tunnel diode 12 is in the low voltage operating condition.

On the other hand, the reset clock signal supplied by source 50 is a negative-going signal. This signal normally tends to reverse bias diodes 24 and 28. However, since the diode 24 has previously had forward current flow therethrough toward tunnel diode 12, the negative signal supplied by source 50 now causes reverse current flow through diode 24 because of the charge stored therein. The reverse current through storage diode 24 is effectively removed from tunnel diode 12. Thus, reverse current only flows through storage diode 24 and storage diode 28 remains cut off. Since storage diode 28 is cut off, rectifier diode 32 remains effectively nonconductive and no output signal is applied to terminal 58.

If now, it is assumed that the signal supplied by input source 10 and applied to tunnel diode 12 is sufficient to cause the tunnel diode to be switched to the high level voltage operating condition, a potential of approximately +450 millivolts exists at the anode thereof. This potential is applied to the anode of storage diode 22 and to the cathode of storage diode 24. In view of the potentials applied at the anode of storage diode 24 and cathode of storage diode 22, it is obvious that storage diode 24 is cut off and storage diode 22 conducts forward current therethrough.

In view of the conduction of storage diode 22, the potential at the cathode thereof rises to approximately −150 millivolts whereby storage diode 26 is biased below the forward conduction voltage region and cut off. Thus, the forward current and charge storage phenomena occur in storage diode 22 but not in storage diode 26. Since storage diode 24 is cut off, the potentials at the anode and cathode of storage diode 28 remain approximately the same as those designated whereby storage diode 28 conducts forward current therethrough and stores charge therein. Again, the application of set and reset clock signals by sources 34 and 50 respectively causes reverse current flow through the diodes having charge stored therein. Thus, the set clock signal applied by source 34 continues to reverse bias the storage diode 26 but causes a reverse current flow through storage diode 22 into tunnel diode 12. The negative going reset clock signal supplied by source 50 causes storage diode 24 to remain reverse biased and causes reverse current flow through storage diode 28. The reverse current flow through storage diode 28 created by the negative going signal supplied by source 50 requires a large current which cannot be supplied by the substantially constant current source comprising potential source 54 and resistor 52. Therefore, the rectifier diode 32 which is connected to terminal 58, which is further connected to additional circuitry, supplies the current path for the reverse current flow through storage diode 28. Thus, the output signal at output terminal 58 is a negative-going signal which is "applied" to the additional circuitry not shown.

Thus, depending upon the operating condition of the input tunnel diode 12, which comprises the control logic stage, different ones of the storage diodes in the two pairs of storage diodes will conduct. Because of the oppositely sensed connections of the diode pairs and the opposite polarity of the clock signals supplied thereto, when one of the diode pairs "steers" a current signal to the output pulse terminal, the other of the diode pairs "steers" a current signal toward the input logic circuit. Thus, only one of the output terminals receives a signal at any time. Clearly, the type of output signal (i.e., Set or Reset Clock signal) is controlled by the input logic circuit. Therefore, even though the set and reset signals supplied by sources 34 and 50 may be rapidly recurring signals, a relatively slow input logic circuit or level type input signal can control the production of the Set or Reset Clock signal. Therefore, the external circuitry may effectively "see" only Set (or Reset) Clock signals, to the exclusion of the opposite type of signal. Therefore, the external circuitry may effectively remain in one or the other of its operating conditions. This type of operation permits any of the external circuits to operate substantially as flip-flop circuits. This type of operation may be desired in many applications.

Having described the circuit and its operation, it is to be emphasized that the description presents only a preferred embodiment of the invention and is not meant to be limitative thereof. That is, modifications may be made in any of the specified components or in the parameters of the circuit. The modifications which are obvious to those skilled in the art are meant to fall within the inventive principles of this circuit. The scope of this invention is defined by the appended claims.

The embodiments of the invention in which an exclusive property or privilege is claimed are defined as follows:

1. A signal control circuit comprising, input means, tunnel diode means having an anode and a cathode, said tunnel diode means characterized by separate high and low-voltage operating conditions, first bias means connected to said tunnel diode to provide for bistable operation thereof, first signal supplying means for providing recurring signals of one polarity, first current sink means connected to said first signal supplying means, first charge storage diode means having an anode and a cathode, said anode of said first charge storage diode means connected to the anode of said tunnel diode means and said cathode of said first charge storage means connected to said first signal supplying means and to said first current sink, second signal supplying means for providing recurring signals simultaneous with but in opposite polarity to the signals produced by said first signal supplying means, second current source means connected to said second signal supplying means, second charge storage diode means having an anode and a cathode, said cathode of said second charge storage diode means connected to the anode of said tunnel diode means and said anode of said second charge storage diode means connected to said second signal supplying means and said second current source means, first current source means, third charge storage diode means having an anode and a cathode, said anode of said third charge storage diode means connected to said first current source means and said cathode of said third charge storage diode means connected to said first signal supplying means and said first current sink means, first output means connected to the anode of said third charge storage diode means, second current sink means, fourth charge storage diode means having an anode and a cathode, said cathode of said fourth charge storage diode means connected to said second current sink means and said anode of said fourth charge storage diode means connected to said second signal supplying means and said second current source means, and second output means connected to said cathode of said fourth charge storage diode means.

2. The signal control circuit of claim 1 wherein a first isolation diode is connected between said first output means and the anode of said third charge storage diode means such that current is passed only to said first output means, and a second isolation diode is connected between said second output means and the cathode of said fourth charge diode means such that current is passed only from said second output means.

3. A signal control circuit comprising, input means for supplying input signals having a high or a low level alternatively, tunnel diode means characterized by separate high and low-voltage operating conditions, said tunnel diode means operating in the high voltage condition in response to a high level input signal and operating in the low voltage condition in response to a low level input signal, first bias means connected to said tunnel diode to provide for bistable operation thereof, first signal supplying means for providing recurring signals of one polarity, first current sink means connected to said first signal supplying means, first charge storage diode means connected between said tunnel diode means and said first signal supplying means and said first current sink such that forward current flows from said tunnel diode to said first current sink and reverse current flows from said first signal supplying means to said tunnel diode means, second signal supplying means for providing recurring signals simultaneous with but in opposite polarity to the signals produced by said first signal supplying means, second current source means connected to said second signal supplying means, second charge storage diode means connected between said tunnel diode means and said second signal supplying means and said second current source means such that forward current flows from said second current source to said tunnel diode and reverse current flows from said tunnel diode to said second signal supplying means, first current source means, third charge storage diode means connected between said first current source means and said first signal supplying means and said first current sink means such that forward current flows from said first current source to said first current sink means and reverse current flows from said first signal supplying means to first output means, first output means connected to said third charge storage diode means, second current sink means, fourth charge storage diode means connected between said second current sink means and said second signal supplying means and said second current source means such that forward current flows from said second current source means to said second current sink means and reverse current flows from second output means to said second signal supplying means, and second output means connected to said fourth charge storage diode means.

4. Signal controlling means comprising, a tunnel diode having high and low voltage operating states, means for controlling the operation of said tunnel diode and determining the operating state thereof, first and second charge storage means, one of said first and second charge storage means connected to said tunnel diode, first current supplying means connected to said first and second charge storage means such that one of said first and second charge storage means stores charge therein when said tunnel diode is in said high voltage operating state and the other of said first and second charge storage means stores charge therein when said tunnel diode is in said low voltage operating state, first output means connected to the one of said first and second charge storage means which is not connected to said tunnel idode, first signal supplying means for selectively supplying signals of one polarity, said first signal supplying means connected to said first and second charge storage means for supplying a signal therethrough in response to the prior storage of charge therein, third and fourth charge storage means, one of said third and fourth charge storage means connected to said tunnel diode, second current supplying means connected to said third and fourth charge storage means such that one of said third and fourth charge storage means stores charge therein when said tunnel diode is in said high voltage operating state and the other of said third and fourth charge storage means stores charge therein when said tunnel diode is in said low voltage operating state, second output means connected to the one of said third and fourth charge storage means which is not connected to said tunnel diode, second signal supplying means for selectively supplying signals having opposite polarity to the signals applied by said first signal supplying means, second signal supplying means connected to said third and fourth charge storage means for supplying a signal therethrough in response to the prior storage of charge therein.

5. Signal controlling means comprising, a tunnel diode having high and low voltage operating states, means for controlling the operation of said tunnel idode and determining the operating state thereof, first and second charge storage means connected together in oppositely poled configuration, one of said first and second charge storage means connected to said tunnel diode, first current supplying means connected to said first and second charge storage means such that one of said first and second charge storage means stores charge therein when said tunnel diode is in said high voltage operating state and the other of said first and second charge storage means stores charge therein when said tunnel diode is in said low voltage operating state, first output means connected to the one of said first and second charge means which is not connected to said tunnel diode, first signal supplying means for selectively supplying signals of one polarity to said first and second charge storage means such that a reverse current signal only is passed through the charge storage means which has previously stored charge therein, third and fourth charge storage means connected together in oppositely poled configuration which is different from the configuration of said first and second charge storage means, one of said third and fourth charge storage means connected to said tunnel diode, second current supplying means connected to said third and fourth charge storage means such that one of said third and fourth charge storage means stores charge therein when said tunnel diode is in said high voltage operating state and the other of said third and fourth charge storage means stores charge therein when said tunnel diode is in said low voltage operating state, second output means connected to the one of said third and fourth charge storage means which is not connected to said tunnel diode, second signal supplying means for selectively supplying signals of opposite polarity to the signals supplied by said first signal supplying means to said third and fourth charge storage means such that a reverse current signal only is passed through the charge storage means which has previously stored charge therein.

No references cited.

ARTHUR GAUSS, *Primary Examiner.*